(12) United States Patent
Kudo

(10) Patent No.: US 12,552,315 B2
(45) Date of Patent: Feb. 17, 2026

(54) VEHICLE OPERATING ASSISTANCE SYSTEM

(71) Applicant: SUBARU CORPORATION, Tokyo (JP)

(72) Inventor: Shinya Kudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 19 days.

(21) Appl. No.: 18/883,425

(22) Filed: Sep. 12, 2024

(65) Prior Publication Data

US 2025/0108757 A1 Apr. 3, 2025

(30) Foreign Application Priority Data

Sep. 28, 2023 (JP) .................. 2023-168491

(51) Int. Cl.
*B60Q 9/00* (2006.01)
*F02D 41/02* (2006.01)

(52) U.S. Cl.
CPC ............ *B60Q 9/00* (2013.01); *F02D 41/021* (2013.01); *F02D 2200/70* (2013.01)

(58) Field of Classification Search
CPC ...... F02D 2200/70; F02D 41/021; B60Q 9/00
See application file for complete search history.

(56) References Cited

FOREIGN PATENT DOCUMENTS

| DE | 102015216502 A1 | * | 3/2017 |
|---|---|---|---|
| JP | 2010152494 A | * | 7/2010 |
| JP | 2014-96168 A | | 5/2014 |
| JP | 2019-8415 A | | 1/2019 |

* cited by examiner

*Primary Examiner* — Kevin A Lathers
(74) *Attorney, Agent, or Firm* — TROUTMAN PEPPER LOCKE LLP

(57) ABSTRACT

A vehicle operating assistance system includes a travel environment recognition unit, a first notification unit, a second notification unit, and an adjustment unit. The travel environment recognition unit recognizes travel environment information of a vehicle including the traffic signal lighting status. The first notification unit issues an advance notification of a change in the lighting status to the driver who drives the vehicle, when the remaining time until the lighting status changes reaches a set time while the vehicle is stopped due to a red light. The second notification unit issues, to the driver, a clear-to-start notification for the vehicle, when a delay time elapses since it is determined, while the vehicle is stopped, that external conditions are clear for the vehicle to proceed. The adjustment unit adjusts the delay time to be longer when the advance notification is issued than when no advance notification is issued.

7 Claims, 12 Drawing Sheets

VEHICLE OPERATING ASSISTANCE SYSTEM

CROSS-REFERENCE TO RELATED APPLICATION

The present application claims priority from Japanese Patent Application No. 2023-168491 filed on Sep. 28, 2023, the entire contents of which are hereby incorporated by reference.

BACKGROUND

The disclosure relates to vehicle operating assistance systems that are capable of issuing notifications regarding travel environment information to drivers.

Technologies that suitably alert the driver, who operates the subject vehicle, in a predetermine manner based on travel environment information while the subject vehicle is stopped have been known for some time in vehicle operating assistance systems.

For example, Japanese Unexamined Patent Application Publication (JP-A) No. 2014-96168 discloses a technique that acquires time-series information about the lighting status of a traffic signal using a receiver and provides the driver with lighting time information that indicates the remaining time until the red light of the traffic signal changes.

For example, JP-A No. 2019-8415 discloses a technology that, while the subject vehicle is stopped, determines the subject vehicle can start at the moment the front vehicle starts and outputs a start alert at a predetermined timing.

These notifications are effective in prompting drivers to start vehicles at the appropriate timing.

SUMMARY

An aspect of the disclosure provides a vehicle operating assistance system. The vehicle operating assistance system includes a travel environment recognition unit, a first notification unit, a second notification unit, and an adjustment unit. The travel environment recognition unit is configured to recognize travel environment information of a vehicle including the lighting status of a traffic signal. The first notification unit is configured to issue an advance notification of a change in the lighting status of the traffic signal to the driver who operates the vehicle, when the remaining time until the lighting status changes reaches a set time while the vehicle is stopped because the traffic signal illuminates a red light. The second notification unit is configured to issue, to the driver, a clear-to-start notification for the vehicle, when a delay time elapses since it is determined, while the vehicle is stopped, that an external condition is clear for the vehicle to proceed. The adjustment unit is configured to adjust the delay time to be longer when the advance notification is issued by the first notification unit than when no advance notification is issued.

A vehicle operating assistance system according to an aspect of the disclosure includes a travel environment recognition module and a processor. The travel environment recognition module includes a sensor and is configured to recognize travel environment information of a vehicle including the lighting status of a traffic signal. The processor is configured to issue an advance notification of a change in the lighting status of the traffic signal to the driver who operates the vehicle, when the remaining time until the lighting status changes reaches a set time while the vehicle is stopped because the traffic signal illuminates a red light. The processor is configured to issue a clear-to-start notification for the vehicle to the driver, when a delay time elapses since it is determined, while the vehicle is stopped, that an external condition is clear for the vehicle to proceed. The processor is configured to, for issuing the clear-to-start notification, adjust the delay time to be longer when the advance notification is issued than when no advance notification is issued.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
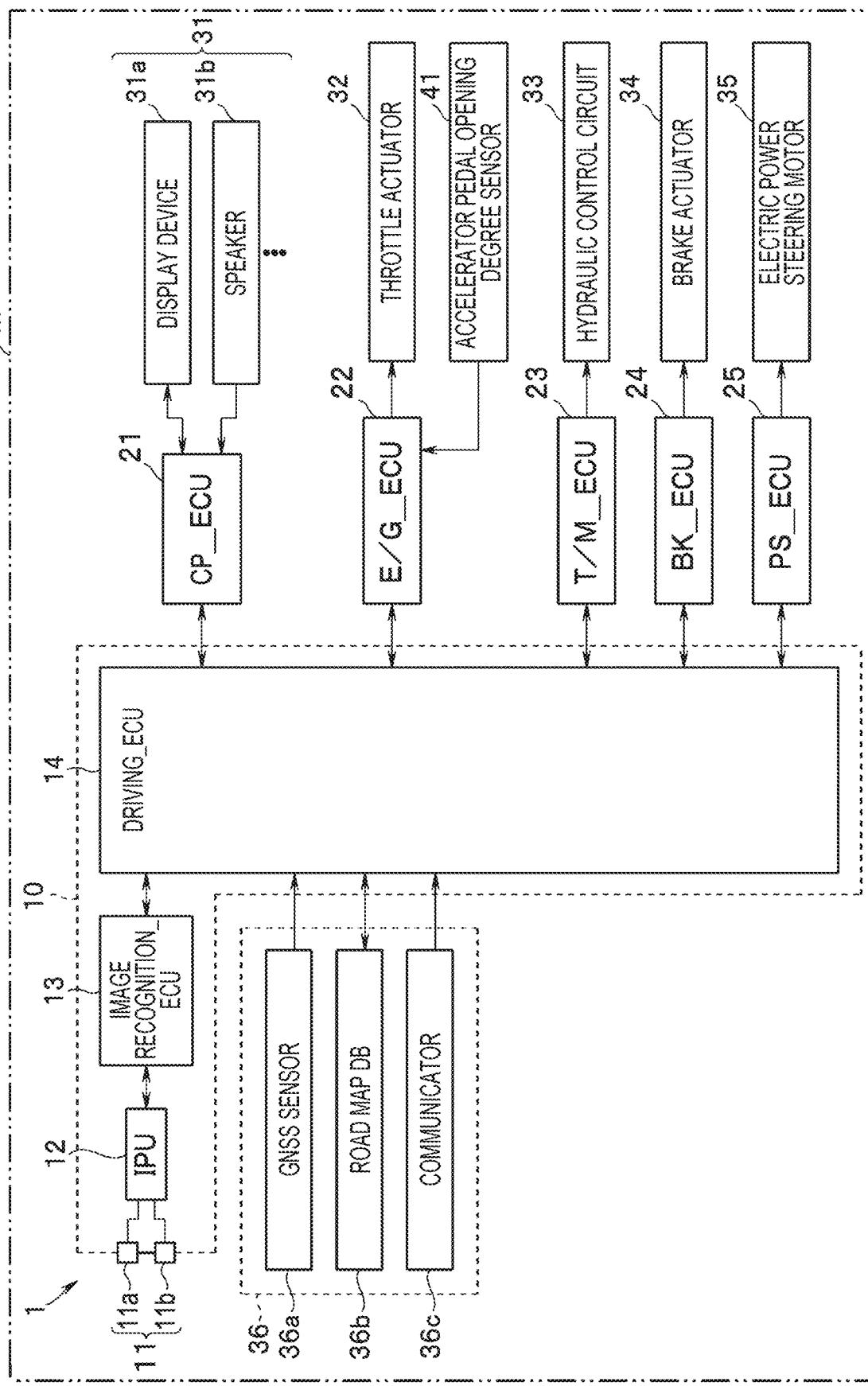
FIG. 1 is a schematic diagram of an operating assistance system.

If notifications such as the alert described above are given successively within a short period, this frequency may annoy the driver, and none of the notifications may work effectively for the driver.

It is desirable to provide vehicle operating assistance systems designed to issue effective notifications that prompt the driver to start the subject vehicle without causing annoyance.

Hereinafter, an embodiment of an aspect of the disclosure will be described in detail with reference to the accompanying drawings. In the drawings used in the following description, the scale of individual configuration elements may vary to ensure that each configuration element is large enough to be visible. For this reason, the disclosure is not limited to the quantity, shape, size ratio, and relative positional relationship of the configuration elements as illustrated in the drawings.

As illustrated in FIG. 1, an operating assistance system 1 includes a camera unit 10, for example, fixed at the upper center of the front portion of the cabin of a vehicle (subject vehicle) M.

The camera unit 10 includes a stereo camera 11, an image processing unit (IPU) 12, an image recognition unit (image recognition_ECU) 13, and a driving control unit (driving_ECU) 14.

The stereo camera 11 includes a main camera 11a and a sub-camera 11b. The main camera 11a and the sub-camera 11b are, for example, symmetrically positioned on the left and right sides of the center of the vehicle in the vehicle width direction. The main camera 11a and the sub-camera 11b include imaging elements such as complementary metal-oxide semiconductor (CMOS) devices and color filters. As a result, the main camera 11a and the sub-camera 11b capture color images of the travel environment of the exterior area in front of the vehicle from different viewpoints, at predetermined image capturing intervals with synchronization ensured between the main camera 11a and the sub-camera 11b.

The IPU 12 is operable to process images of the travel environment captured by the stereo camera 11 in a predetermined manner. By doing this, the IPU 12 detects the edges of various objects represented in the images, such as three-dimensional objects and demarcation lines on the road surface. The IPU 12 is also operable to acquire distance information based on the amount of misalignment between corresponding edges in the left and right images. Accordingly, the IPU 12 generates image information including distance information (distance-image information).

The image recognition_ECU 13 is operable to acquire information about the lane (subject vehicle travel lane) in which the subject vehicle M is traveling, based on information such as the distance-image information received from the IPU 12. For example, the image recognition_ECU 13 calculates the road curvature [1/m] of the demarcation lines that define the left and right sides of the subject vehicle travel lane, and the width (lane width) between the left and right demarcation lines. The image recognition_ECU 13 also calculates the road curvature of the demarcation lines that define the left and right sides of, for example, lanes adjacent to the lane in which the subject vehicle M travels, and the width (lane width) between the left and right demarcation lines.

The image recognition_ECU 13 is also operable to perform other operations including predetermined pattern matching on distance-image information. This allows the image recognition_ECU 13 to recognize three-dimensional objects such as guard rails, curbs, and median strips that exist along the road, and surrounding vehicles traveling on the road. To recognize three-dimensional objects, the image recognition_ECU 13 identifies accompanying information such as the object type, object distance, object speed, and the relative speed between the object and the subject vehicle M.

Furthermore, the image recognition_ECU 13 performs traffic signal recognition ahead of the subject vehicle M. In this traffic signal recognition, the image recognition_ECU 13 recognizes the lighting status of the lights (green, yellow, and red lights) arranged on the traffic signal body. When an arrow light is added to the traffic signal body, the image recognition_ECU 13 also recognizes the lighting status of the arrow light.

The image recognition_ECU 13 outputs the various kinds of acquired information as travel environment information to the driving_ECU 14.

In the present embodiment, the image recognition_ECU 13, together with the stereo camera 11 and the IPU 12, corresponds to a specific example of a travel environment recognition unit (a travel environment recognition module) designed to recognize travel environment information.

The driving_ECU 14 serves as a control unit for overall control of the operating assistance system 1.

The driving_ECU 14 is coupled to a cockpit control unit (CP_ECU) 21, an engine control unit (E/G_ECU) 22, a transmission control unit (T/M_ECU) 23, a brake control unit (BK_ECU) 24, and a power steering control unit (PS_ECU) 25, through in-vehicle communication lines such as a Controller Area Network (CAN).

Additionally, various sensors such as a locator unit 36 are coupled to the driving_ECU 14.

A human-machine interface (HMI) 31 installed near the driver's seat is coupled to the CP_ECU 21. The HMI 31 includes, for example, a display device 31a and a speaker 31b.

The display device 31a is operable to display various kinds of information about operating assistance control and other specifics for the driver and others. It is desirable for the display device 31a, for example, to be implemented as a touch panel display that the driver or others can operate through inputs.

The speaker 31b is operable to provide the driver and others with various kinds of information about operating assistance control and other specifics through sound.

When the CP_ECU 21 receives various kinds of information about operating assistance control and other specifics from the driving_ECU 14, the CP_ECU 21 provides the received information to the driver in an appropriate manner. The received information can be, for example, displayed using the display device 31a and outputted as sound using the speaker 31b.

Engine auxiliaries such as a throttle actuator 32 are coupled to the output side of the E/G_ECU 22. Various sensors such as an accelerator pedal opening degree sensor 41 are coupled to the input side of the E/G_ECU 22.

The E/G_ECU 22 is operable to perform drive control of the throttle actuator 32, for example, based on control signals from the driving_ECU 14 or detection signals from the various sensors. By performing this drive control, the E/G_ECU 22 adjusts the engine airflow rate to produce the desired engine output. The E/G_ECU 22 is also operable to output signals detected by the various sensors, such as the degree of accelerator pedal opening, to the driving_ECU 14.

In the present embodiment, the E/G_ECU 22 corresponds to a specific example of a drive source control unit (engine control unit).

A hydraulic control circuit 33 is coupled to the output side of the T/M_ECU 23. Various sensors such as a shift position sensor (not illustrated) are coupled to the input side of the T/M_ECU 23. The T/M_ECU 23 is operable to perform hydraulic pressure control of the hydraulic control circuit 33, for example, based on engine torque signals estimated by the E/G_ECU 22 and detection signals from the various sensors. By performing this drive control, the T/M_ECU 23 activates components provided in an automatic transmission, such as frictional engagement elements and pulleys, to change the engine output to achieve the desired transmission ratio. The T/M_ECU 23 is also operable to output signals detected by the various sensors, such as the shift position, to the driving_ECU 14.

A brake actuator 34 is coupled to the output side of BK_ECU 24. The brake actuator 34 is operable to individually adjust the pressure of brake fluid output to brake wheel cylinders provided for wheels. Various sensors such as a brake pedal sensor, a yaw rate sensor, a front/rear acceleration sensor, and a vehicle speed sensor (not illustrated) are coupled to the input side of BK_ECU 24.

The BK_ECU 24 is operable to perform drive control of the brake actuator 34 based on control signals from the driving_ECU 14 or detection signals from the various sensors. By performing this drive control, the BK_ECU 24 applies braking forces to individual wheels as necessary to provide control such as forced braking control or yaw rate control on the subject vehicle M. The BK_ECU 24 is also operable to output signals detected by the various sensors, such as the brake operating state, yaw rate, front/rear acceleration, and vehicle speed (subject vehicle speed), to the driving_ECU 14.

An electric power steering motor 35 is coupled to the output side of the PS_ECU 25. The electric power steering motor 35 is operable to supply steering torque to a steering mechanism, generated through the motor rotational force. Various sensors such as a steering torque sensor and a steering angle sensor are coupled to the input side of PS_ECU 25.

The PS_ECU 25 is operable to perform drive control of the electric power steering motor 35 based on control signals from the driving_ECU 14 or detection signals from the various sensors. By performing this drive control, the PS_ECU 25 produces steering torque for the steering mechanism. The PS_ECU 25 is also operable to output signals detected by the various sensors, such as the steering torque and steering angle, to the driving_ECU 14.

The locator unit 36 includes a global navigation satellite system (GNSS) sensor 36a, a high-precision road map database (road map DB) 36b, and a communicator 36c.

The GNSS sensor 36a is operable to receive positioning signals transmitted from positioning satellites. Based on these positioning signals, the GNSS sensor 36a measures the location (for example, latitude, longitude, and altitude) of the subject vehicle M.

The road map DB 36b is a high-capacity storage medium, such as a hard disk drive (HDD). High-precision road map information (dynamic map) is stored in the road map DB 36b. The road map information includes, for example, lane data for automated driving, such as lane width data, lane center position coordinate data, lane travel azimuth angle data, and speed limit data. Lane data is stored for each lane on the road map at intervals of several meters. The road map DB 36b also stores, for example, traffic signal data as data associated with lane data. Traffic signal data may also include, for example, lighting information about individual lights as dynamic information that is updated at any time through external communications or other methods.

For example, in response to a request signal from the driving_ECU 14, the road map DB 36b outputs road map information as travel environment information to the driving_ECU 14. This road map information covers a specified range defined by the subject vehicle's location measured by the GNSS sensor 36a.

The communicator 36c is operable to transmit and receive various kinds of traffic information through communications with external communicators outside the vehicle. For example, the communicator 36c receives various kinds of traffic information transmitted from, for example, a road traffic information communication system (the vehicle information communication system (VICS) (registered trademark)) through road-to-vehicle communication. The communicator 36c is also able to receive various kinds of traffic information transmitted from, for example, surrounding vehicles through vehicle-to-vehicle communication. The traffic information received by the communicator 36c through road-to-vehicle communication includes, for example, information such as the traffic signal lighting status and the timing of changes in the lighting status. The various kinds of traffic information received through external communications with external communicators outside the vehicle can be used as dynamic information to update the road map DB 36b at any time.

In the present embodiment, the road map DB 36b, together with the GNSS sensor 36a and the communicator 36c, corresponds to a specific example of a travel environment recognition unit (a travel environment recognition module) designed to recognize travel environment information.

The driving_ECU 14 performs operating assistance control for the subject vehicle M based on various kinds of information such as operating information about the subject vehicle M input from various on-board sensors and travel environment information input from, for example, the image recognition_ECU 13 and the locator unit 36.

The driving_ECU 14 achieves operating assistance control by primarily using technologies such as adaptive cruise control (ACC), active lane keep centering (ALKC), and active lane keep bouncing (ALKB), which can be combined as appropriate.

The driving_ECU 14 also performs various notification controls for the driver as part of operating assistance control. As one of the notification controls for the driver, the driving_ECU 14 issues a notification (start notification) to prompt the driver to start the stopped subject vehicle M. This start notification can be issued when travel environment information satisfies preset criteria while the subject vehicle M is stopped.

For example, for the case in which the subject vehicle M is stopped due to a red light, the driving_ECU 14 issues an advance notification about changes in the traffic signal lighting status as a first start notification. This advance notification is used to notify the driver in advance of a change in the traffic signal lighting status, when a remaining time T1 until the traffic signal lighting status changes reaches a set time Tth (for example, Tth=2 seconds). Here, in the present embodiment, the case in which the traffic signal lighting status changes include, for example, the case in which a red light turns off and a green light turns on, as well as the case in which an arrow light permitting the subject vehicle M to proceed turns on while the red light remains on.

To issue this advance notification, for example, dynamic information about traffic signals is input to the driving_ECU 14 from the road map DB 36b. Alternatively, received information about traffic signals is input to the driving_ECU 14 through the communicator 36c.

For example, for the case in which the subject vehicle M is stopped due to a red light, or a traffic jam or other factors, the driving_ECU 14 issues a clear-to-start notification as a second start notification. The clear-to-start notification is used to make the driver aware that external conditions are clear for starting the subject vehicle M.

Here, the requirement for external conditions to be clear for starting the subject vehicle M depends on the travel environment when the subject vehicle M is stopped.

Figure 8:
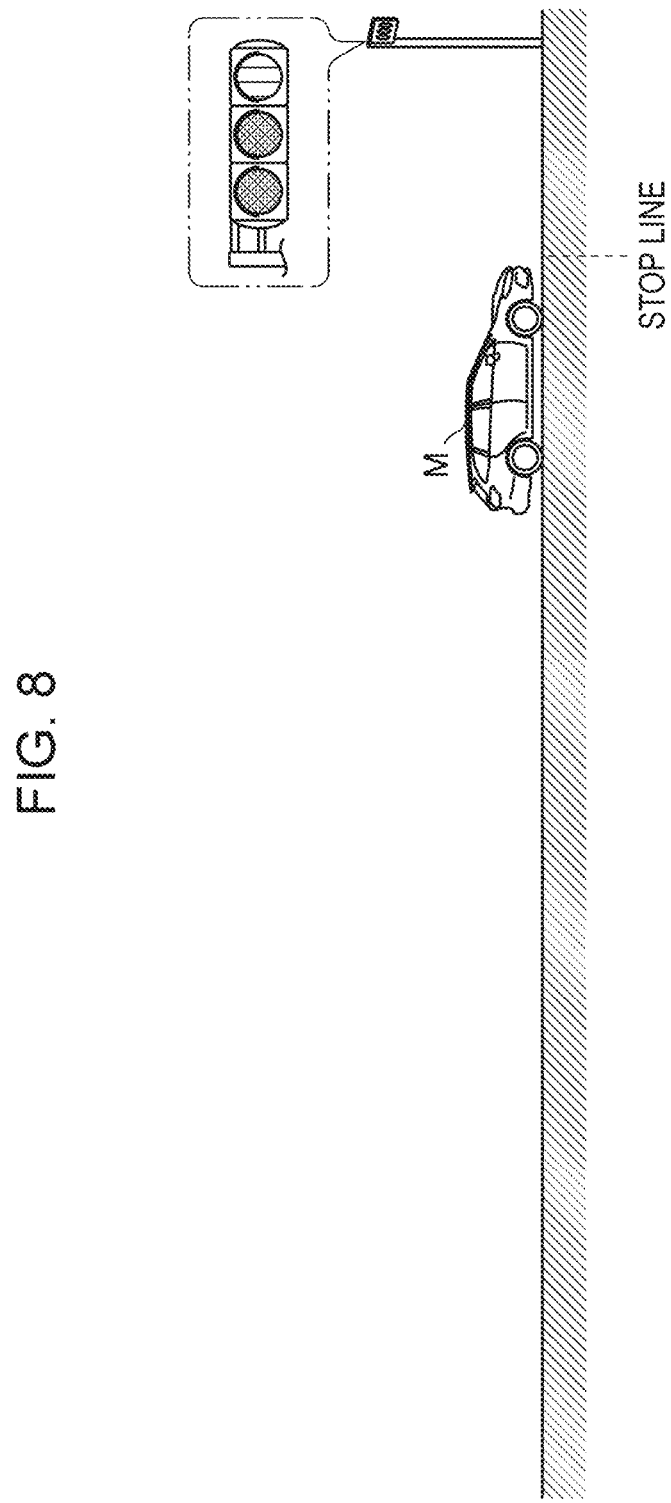
FIG. 8 illustrates a subject vehicle stopped at a red light of a traffic signal.
Figure 9:
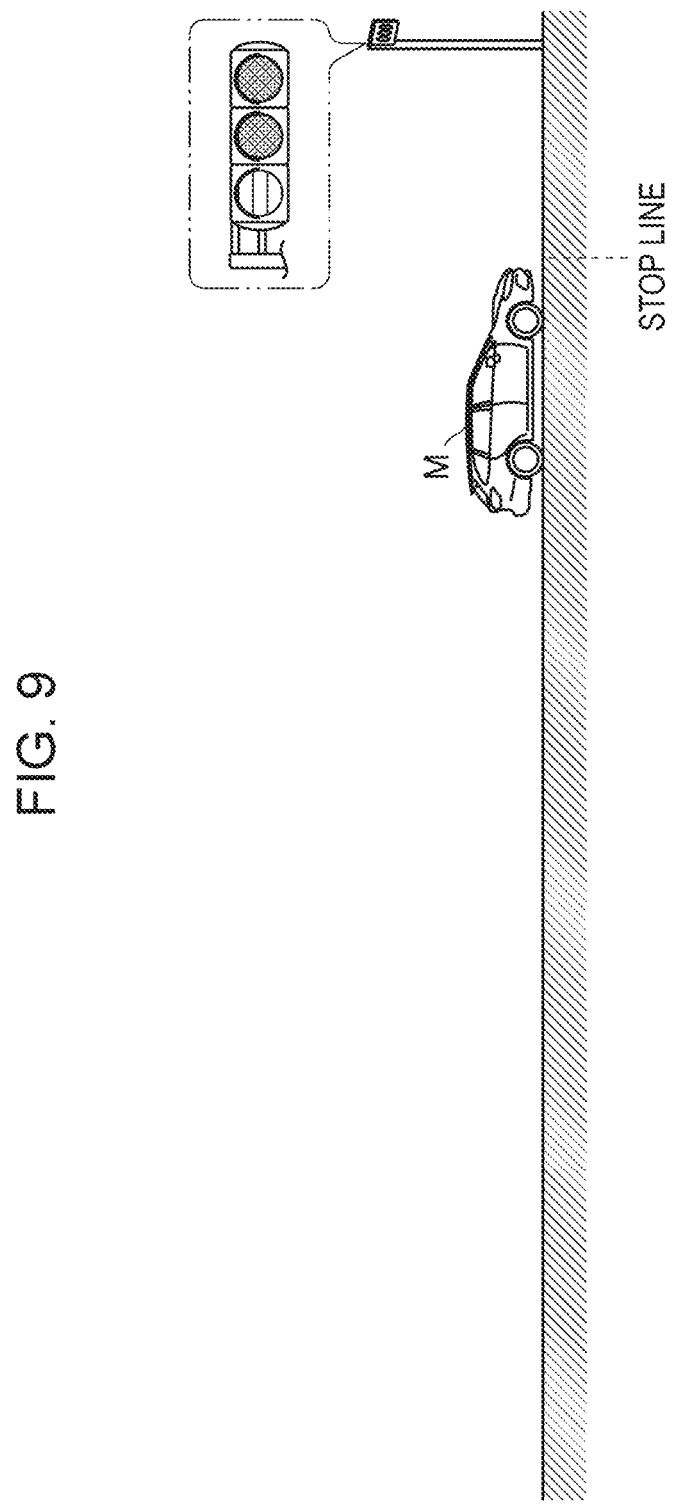
FIG. 9 illustrates the subject vehicle when external conditions become clear for the subject vehicle to proceed, as the red light changes to green at the traffic signal.

For example, given that the subject vehicle M is stopped due to a red light with no preceding vehicle stopped ahead (see FIG. 8), when the traffic signal lighting status changes (see FIG. 9), the driving_ECU 14 determines that external conditions are clear for starting the subject vehicle M.

Figure 10:
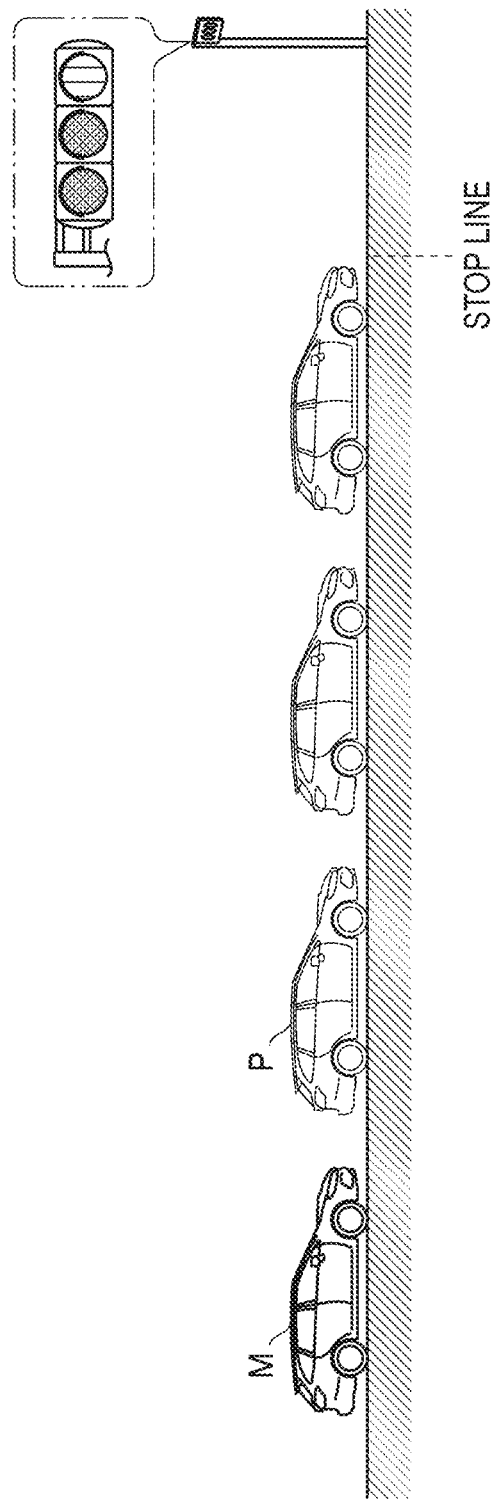
FIG. 10 illustrates a subject vehicle stopped behind a preceding vehicle at a red light of a traffic signal.
Figure 11:
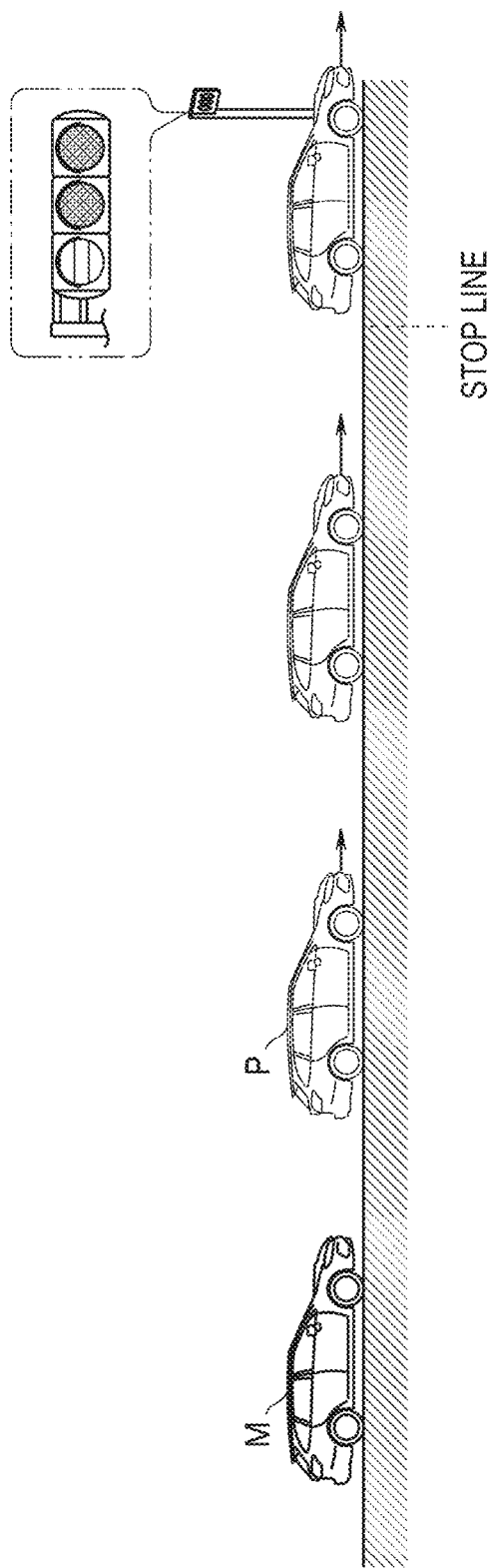
FIG. 11 illustrates the subject vehicle when external conditions become clear for the subject vehicle to start, as the traffic signal changes to green and the preceding vehicle starts.

For example, given that the subject vehicle M is stopped due to a red light with a preceding vehicle P stopped ahead (see FIG. 10), when the traffic signal lighting status changes and the preceding vehicle P starts (see FIG. 11), the driving_ECU 14 determines that external conditions are clear for starting the subject vehicle M.

Figure 12:
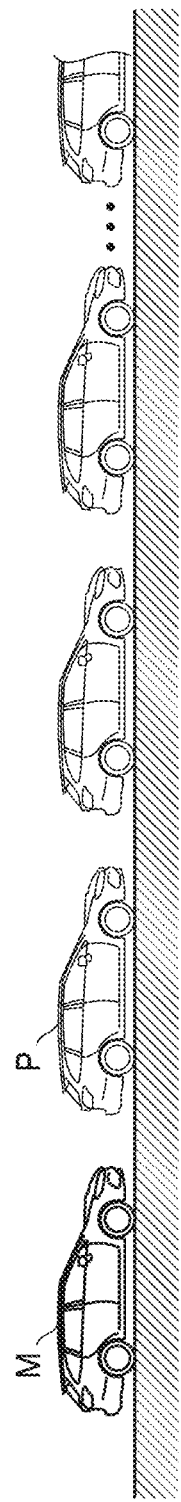
FIG. 12 illustrates a subject vehicle stopped due to a traffic jam.
Figure 13:
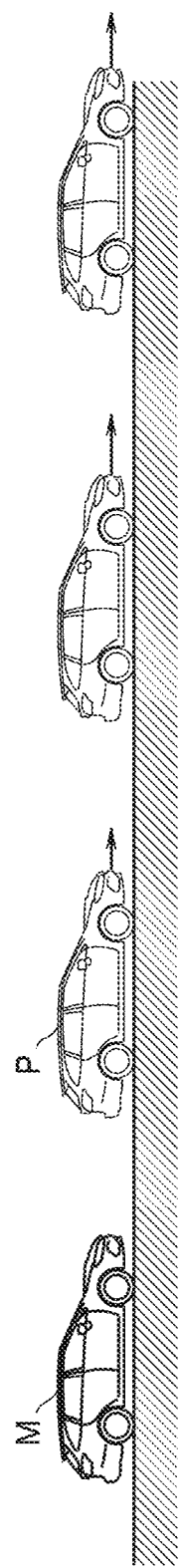
FIG. 13 illustrates the subject vehicle when external conditions become clear for the subject vehicle to start, as the traffic jam clears.

For example, regardless of the traffic signal lighting status, given that a preceding vehicle P is stopped ahead of the subject vehicle M due to a traffic jam or other factors (see FIG. 12), when the traffic jam clears and the preceding vehicle P starts (see FIG. 13), the driving_ECU 14 determines that external conditions are clear for starting the subject vehicle M.

The clear-to-start notification can be issued when the subject vehicle M has not started after a predetermined delay time Td has elapsed since external conditions became clear for starting the subject vehicle M. For this configuration, a reference value for the delay time Td (for example, Td=2 seconds) is preset in the driving_ECU 14.

Figure 6:
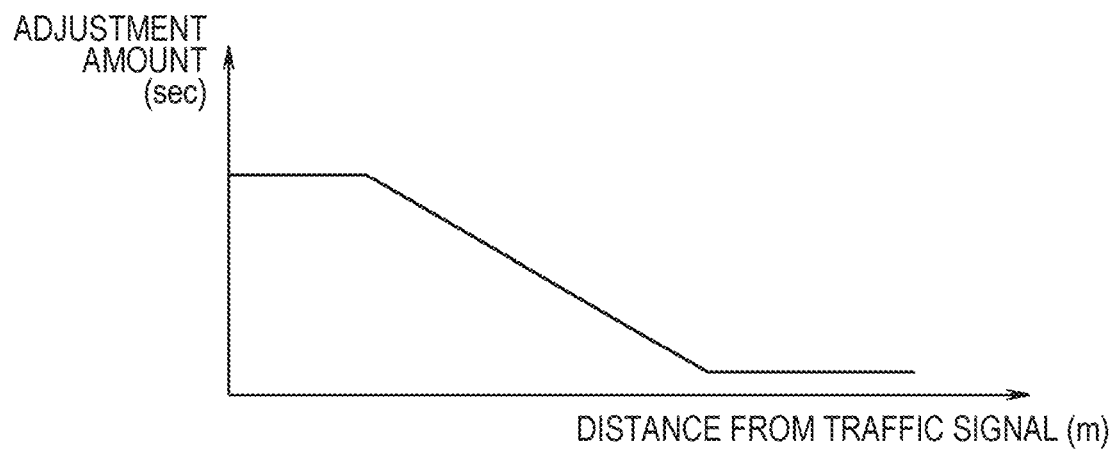
FIG. 6 is a map illustrating a plot of the distance from a traffic signal against the delay time adjustment amount.

When the advance notification is issued, the driving_ECU 14 adjusts the delay time Td to a longer time. It is preferable that the adjustment amount of the delay time Td increases toward longer times as the distance between the traffic signal and the stopped subject vehicle M decreases. For this configuration, a map indicating the relationship between the distance from the traffic signal to the subject vehicle M and the adjustment amount is stored in the driving_ECU 14, for example, as illustrated in FIG. 6.

In the present embodiment, the driving_ECU 14 corresponds to a specific example of a first notification unit, a second notification unit, and an adjustment unit.

Because the start notification includes the advance notification as described above, it is preferable to ensure adequate safety in the case in which the driver mistakenly operates the accelerator pedal in response to the advance notification. As a result, when the advance notification is issued by the driving_ECU 14, the E/G_ECU 22 suppresses engine output in relation to the amount of accelerator pedal depression from when the advance notification is issued until the clear-to-start notification is issued.

Engine output can be suppressed, for example, by multiplying the throttle opening degree, which is calculated based on the amount of accelerator pedal depression, by a predetermined suppression coefficient Cs. In this case, it is preferable that the amount of engine output suppression increases as an elapsed time Tp since the advance notification decreases. For this configuration, a map indicating the relationship between the elapsed time Tp since the advance notification and the suppression coefficient Cs for the throttle opening degree is stored in the E/G_ECU 22.

When the advance notification is issued as the start notification, it is assumed that the subject vehicle M starts shortly after the advance notification. For this reason, after the advance notification, it is preferable to maintain the subject vehicle M in a state ready for a prompt start in preparation for the clear-to-start notification. The E/G_ECU 22 thus prohibits engine stop after the advance notification is issued, regardless of whether engine stop criteria, such as idling stop, are satisfied while the subject vehicle M is stopped.

Figure 2:
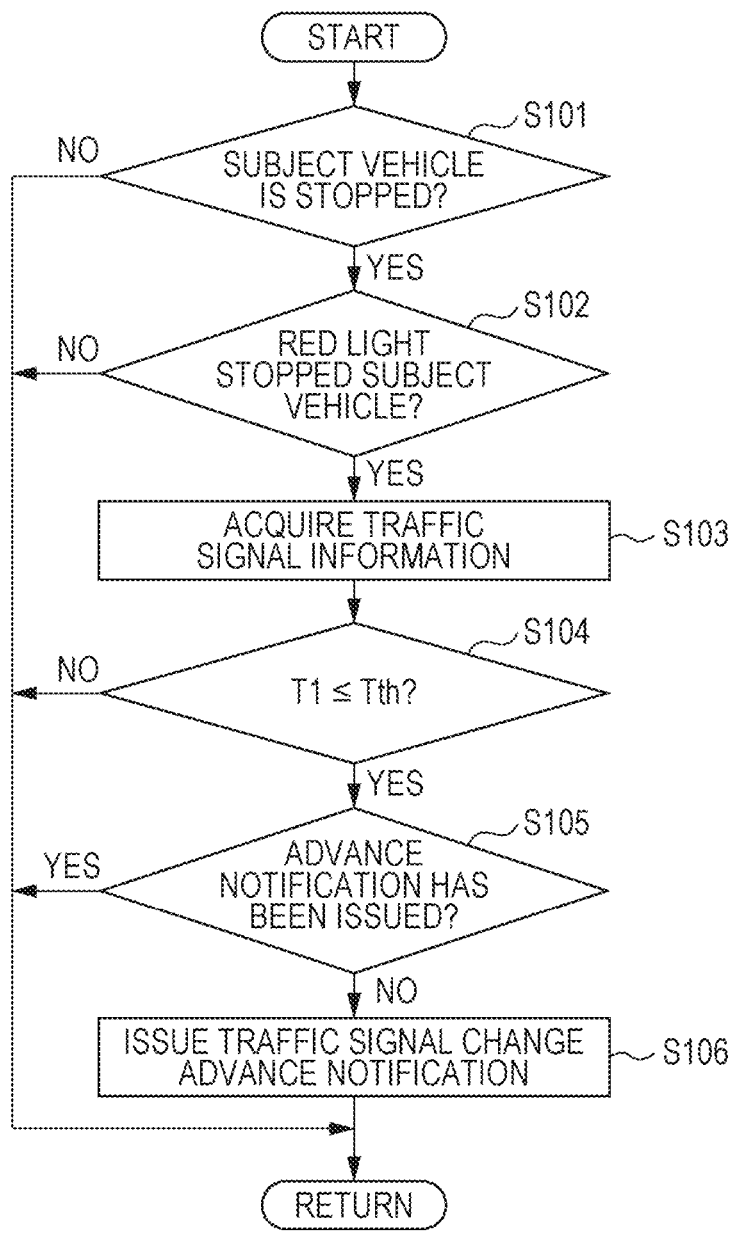
FIG. 2 is a flowchart illustrating a control routine for traffic signal change advance notification.

Next, a control for issuing the traffic signal change advance notification will be described using a flowchart that depicts a control routine for traffic signal change advance notification illustrated in FIG. 2. This routine can be repeated at set time intervals by the driving_ECU 14.

Once the routine starts, in step S101, the driving_ECU 14 checks whether the subject vehicle M is stopped.

When it is determined in step S101 that the subject vehicle M is running (NO in step S101), the driving_ECU 14 exits the routine.

When it is determined in step S101 that the subject vehicle M is stopped (YES in step S101), the driving_ECU 14 proceeds to step S102.

In step S102, the driving_ECU 14 checks whether the subject vehicle M is stopped due to a red light. For example, the driving_ECU 14 checks whether there is a traffic signal illuminating a red light ahead in the travel lane of the stopped subject vehicle M, based on travel environment information.

In step S102, when it is determined that the subject vehicle M is stopped due to a factor other than a red light, the driving_ECU 14 exits the routine.

When it is determined in step S102 that the subject vehicle M is stopped due to a red light, the driving_ECU 14 proceeds to step S103.

In step S103, the driving_ECU 14 acquires information about the traffic signal that stopped the subject vehicle M. For example, the driving_ECU 14 acquires, for the traffic signal that stopped the subject vehicle M, information such as the remaining time T1 until the current lighting status changes, from the locator unit 36 or other units.

In step S104, the driving_ECU 14 checks whether the remaining time T1 is smaller than or equal to the set time Tth.

When it is determined in step S104 that the remaining time T1 is greater than the set time Tth (NO in step S104), the driving_ECU 14 exits the routine.

When it is determined in step S104 that the remaining time T1 is smaller than or equal to the set time Tth (YES in step S104), the driving_ECU 14 proceeds to step S105.

In step S105, the driving_ECU 14 checks whether an advance notification has been issued for the driver.

When it is determined in step S105 that an advance notification has been issued (YES in step S105), the driving_ECU 14 exits the routine.

When it is determined in step S105 that no advance notification has been issued (NO in step S105), the driving_ECU 14 proceeds to step S106.

In step S106, the driving_ECU 14 issues an advance notification about a change in the traffic signal lighting status to the driver and subsequently exits the routine. For example, the driving_ECU 14 instructs the CP_ECU 21 to output an advance notification. In response to this instruction, the CP_ECU 21 controls the display device 31*a* to display a notification stating, for example, "The traffic signal will change soon." Alternatively, the CP_ECU 21 controls the speaker 31*b* to output a notification stating, for example, "The traffic signal will change soon."

Figure 3:
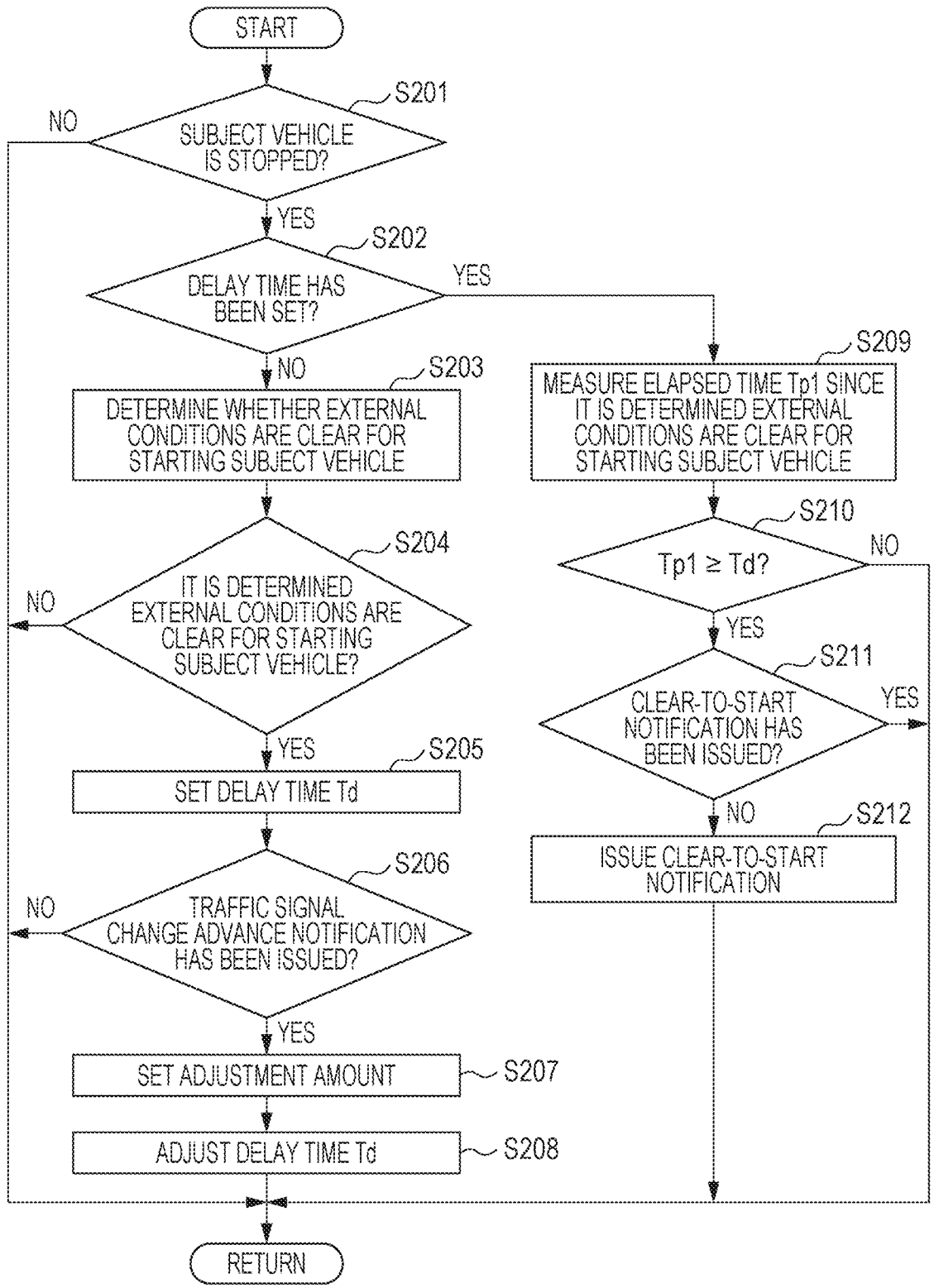
FIG. 3 is a flowchart illustrating a control routine for clear-to-start notification.

Next, a control for issuing the clear-to-start notification will be described using a flowchart that depicts a control routine for clear-to-start notification illustrated in FIG. 3. This routine can be repeated at set time intervals by the driving_ECU 14.

Once the routine starts, in step S201, the driving_ECU 14 checks whether the subject vehicle M is stopped.

When it is determined in step S201 that the subject vehicle M is running (NO in step S201), the driving_ECU 14 exits the routine.

When it is determined in step S201 that the subject vehicle M is stopped (YES in step S201), the driving_ECU 14 proceeds to step S202.

In step S202, the driving_ECU 14 checks whether the delay time Td for issuing clear-to-start notifications has been set.

When it is determined in step S202 that the delay time Td for issuing clear-to-start notifications has been set (YES in step S202), the driving_ECU 14 proceeds to step S209.

When it is determined in step S202 that the delay time Td for issuing clear-to-start notifications has not been set (NO in step S202), the driving_ECU 14 proceeds to step S203.

In step S203, the driving_ECU 14 determines whether external conditions are clear for starting the stopped subject vehicle M, based on travel environment information.

In step S204, the driving_ECU 14 checks whether it is determined that external conditions are clear for starting the subject vehicle M.

When it is determined that external conditions are unclear for starting the subject vehicle M (NO in step S204), the driving_ECU 14 exits the routine.

When it is determined that external conditions are clear for starting the subject vehicle M (YES in step S204), the driving_ECU 14 proceeds to step S205.

In step S205, the driving_ECU 14 sets a reference value for the delay time Td until a clear-to-start notification is issued. For example, the driving_ECU 14 reads a preset reference value for the delay time Td.

In step S206, the driving_ECU 14 checks whether a traffic signal change advance notification for a red light has been issued.

When it is determined in step S206 that no advance notification has been issued (NO in step S206), the driving_ECU 14 exits the routine. In other words, the driving_ECU 14 exits the routine while maintaining the delay time Td that is set in step S205.

When it is determined in step S206 that an advance notification has been issued (YES in step S206), the driving_ECU 14 proceeds to step S207.

In step S207, the driving_ECU 14 sets an adjustment amount for the delay time Td. For example, the driving_ECU 14 references the map illustrated in FIG. 6 and accordingly sets an adjustment amount based on the distance from the traffic signal to the subject vehicle M.

In step S208, the driving_ECU 14 adjusts the delay time Td using the adjustment amount that is set in step S207 and subsequently exits the routine.

When proceeding from step S202 to step S209, the driving_ECU 14 measures an elapsed time Tp1 since it is determined that external conditions are clear for starting the subject vehicle M.

In step S210, the driving_ECU 14 checks whether the elapsed time Tp1 is greater than or equal to the delay time Td.

When it is determined in step S210 that the elapsed time Tp1 is less than the delay time Td (NO in step S210), the driving_ECU 14 exits the routine.

When it is determined in step S210 that the elapsed time Tp1 is greater than or equal to the delay time Td (YES in step S210), the driving_ECU 14 proceeds to step S211.

In step S211, the driving_ECU 14 checks whether a clear-to-start notification has been issued.

When it is determined in step S211 that a clear-to-start notification has been issued (YES in step S211), the driving_ECU 14 exits the routine.

When it is determined in step S211 that no clear-to-start notification has been issued (NO in step S211), the driving_ECU 14 proceeds to step S212.

In step S212, the driving_ECU 14 issues a clear-to-start notification to the driver and subsequently exits the routine. For example, the driving_ECU 14 instructs the CP_ECU 21 to output a clear-to-start notification. In response to this instruction, the CP_ECU 21 controls the display device 31a to display a notification stating, for example, "You can start the car now." Alternatively, the CP_ECU 21 controls the speaker 31b to output a notification stating, for example, "You can start the car now."

Figure 4:
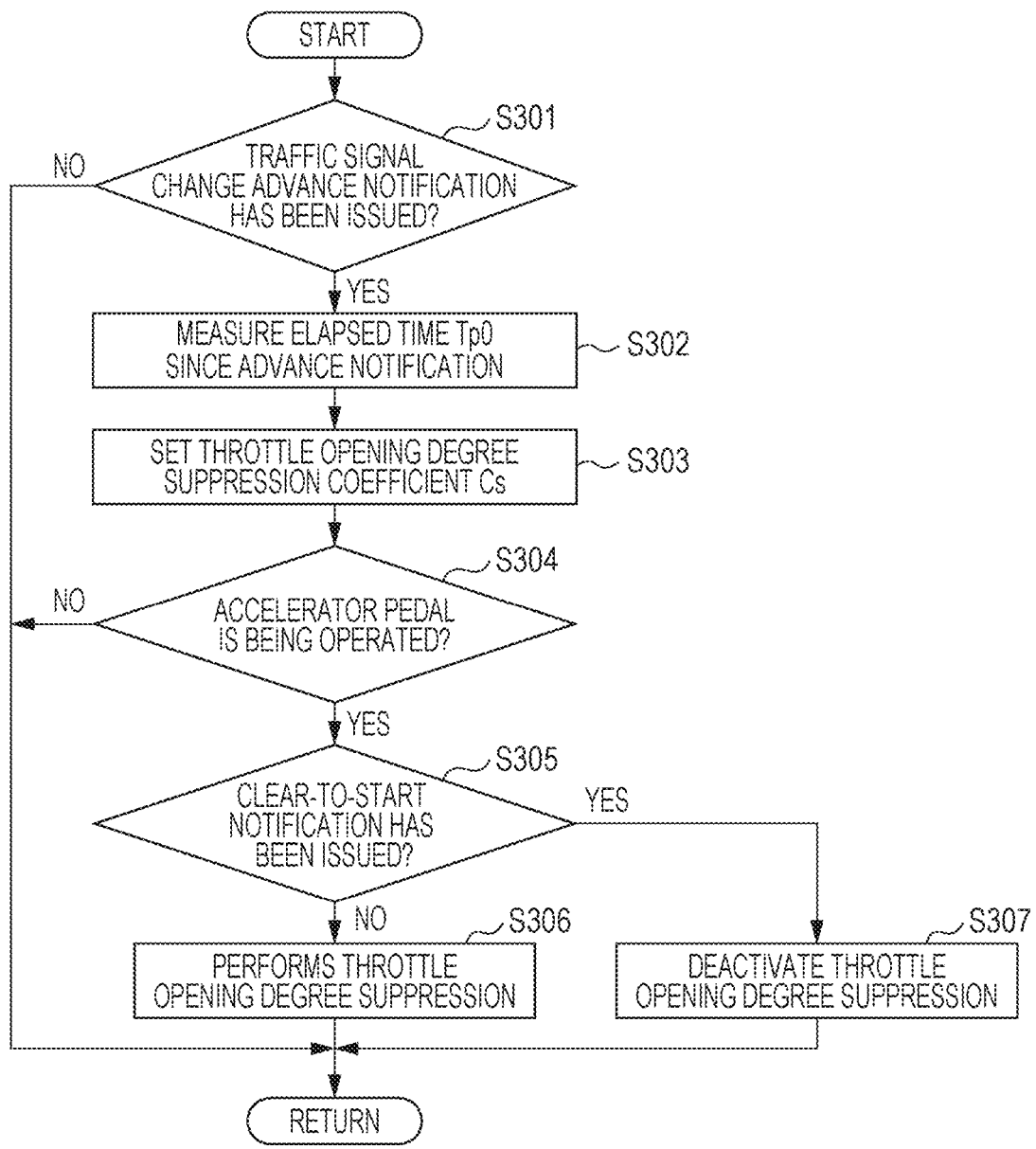
FIG. 4 is a flowchart illustrating a control routine for throttle opening degree suppression.

Next, a control for throttle opening degree suppression for the engine will be described using a flowchart that depicts a control routine for throttle opening degree suppression illustrated in FIG. 4. This routine can be repeated at set time intervals by the E/G_ECU 22.

Once the routine starts, in step S301, the E/G_ECU 22 checks whether a traffic signal change advance notification has been issued by the driving_ECU 14.

When it is determined in step S301 that no advance notification has been issued (NO in step S301), the E/G_ECU 22 exits the routine.

When it is determined in step S301 that an advance notification has been issued (YES in step S301), the E/G_ECU 22 proceeds to step S302.

In step S302, the E/G_ECU 22 measures an elapsed time Tp0 since the advance notification.

Figure 7:
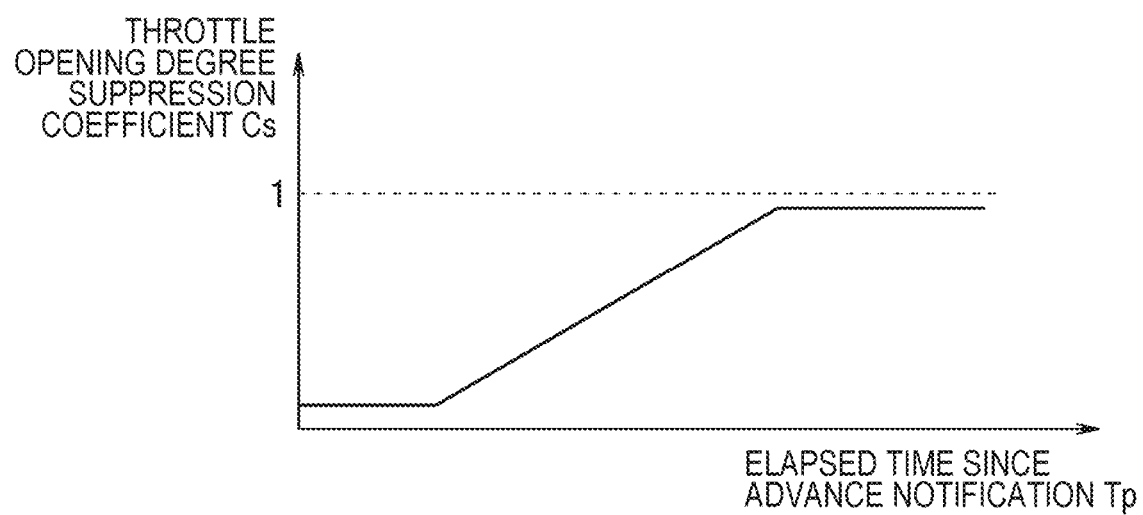
FIG. 7 is a map illustrating a plot of the elapsed time since an advance notification against the throttle opening degree suppression coefficient.

In step S303, the E/G_ECU 22 sets a throttle opening degree suppression coefficient Cs based on the elapsed time Tp0. For example, the E/G_ECU 22 references the map illustrated in FIG. 7 and accordingly sets the suppression coefficient Cs based on the elapsed time Tp0.

In step S304, the E/G_ECU 22 checks whether the accelerator pedal is currently being operated by the driver.

When it is determined in step S304 that the accelerator pedal is not being operated by the driver (NO in step S304), the E/G_ECU 22 exits the routine.

When it is determined in step S304 that the accelerator pedal is being operated by the driver (YES in step S304), the E/G_ECU 22 proceeds to step S305.

In step S305, the E/G_ECU 22 checks whether a clear-to-start notification has been issued by the driving_ECU 14. This implies that the E/G_ECU 22 checks whether a clear-to-start notification has been issued after an advance notification has been issued.

When it is determined in step S305 that no clear-to-start notification has been issued (NO in step S305), the E/G_ECU 22 proceeds to step S306.

In step S306, the E/G_ECU 22 performs suppression control on the throttle opening degree, which is calculated based on the accelerator pedal opening degree, using the suppression coefficient Cs and subsequently exits the routine.

When it is determined in step S305 that a clear-to-start notification has been issued (YES in step S305), the E/G_ECU 22 proceeds to step S307.

In step S307, the E/G_ECU 22 deactivates throttle opening degree suppression using the suppression coefficient Cs and subsequently exits the routine.

Figure 5:
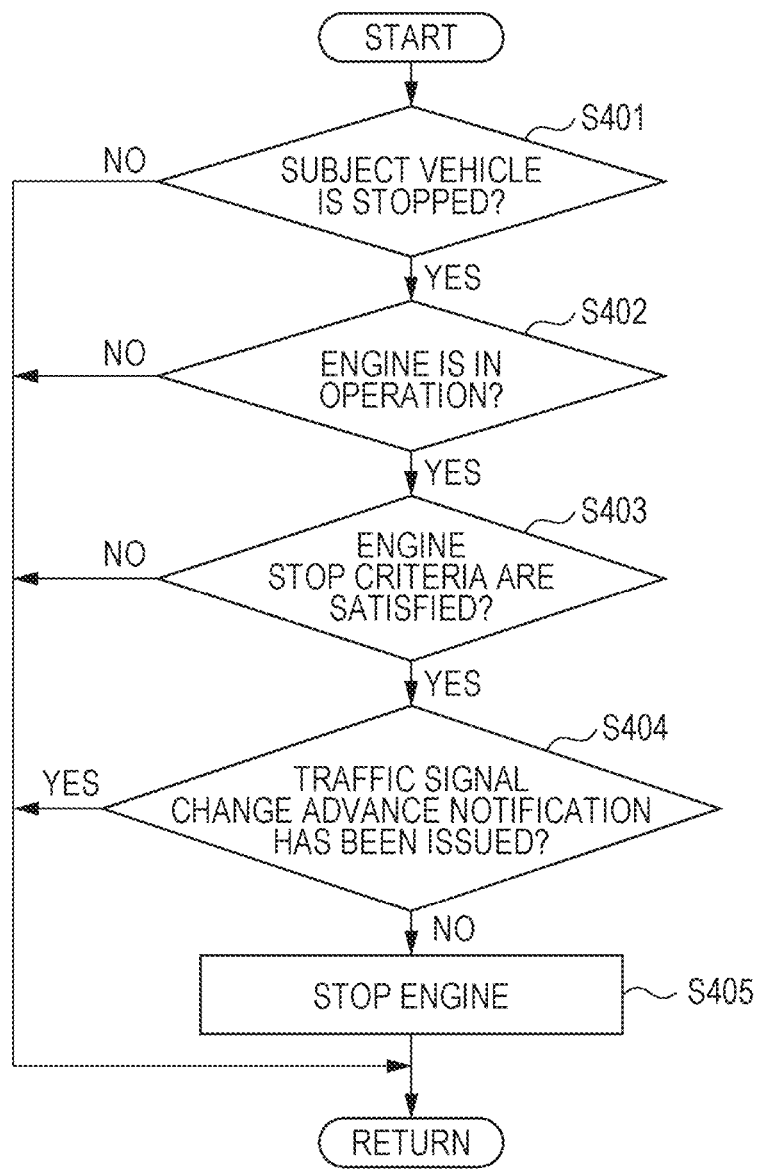
FIG. 5 is a flowchart illustrating a control routine for engine stop.

Next, a control for stopping the engine will be described using a flowchart that depicts a control routine for engine stop illustrated in FIG. 5. This routine can be repeated at set time intervals by the E/G_ECU 22.

Once the routine starts, in step S401, the E/G_ECU 22 checks whether the subject vehicle M is stopped.

When it is determined in step S401 that the subject vehicle M is running (NO in step S401), the E/G_ECU 22 exits the routine.

When it is determined in step S401 that the subject vehicle M is stopped (YES in step S401), the E/G_ECU 22 proceeds to step S402.

In step S402, the E/G_ECU 22 checks whether the engine is in operation.

When it is determined in step S402 that the engine is stopped (NO in step S402), the E/G_ECU 22 exits the routine.

When it is determined in step S402 that the engine is in operation (YES in step S402), the E/G_ECU 22 proceeds to step S403.

In step S403, the E/G_ECU 22 checks whether engine stop criteria, such as idling stop, are satisfied.

When it is determined in step S403 that no engine stop criteria is satisfied (NO in step S403), the E/G_ECU 22 exits the routine.

When it is determined in step S403 that any engine stop criteria are satisfied (YES in step S403), the E/G_ECU 22 proceeds to step S404.

In step S404, the E/G_ECU 22 checks whether a traffic signal change advance notification has been issued by the driving_ECU 14.

When it is determined in step S404 that no advance notification has been issued (NO in step S404), the E/G_ECU 22 exits the routine.

When it is determined in step S404 that an advance notification has been issued (YES in step S404), the E/G_ECU 22 proceeds to step S405.

In step S405, the E/G_ECU 22 stops the engine and exits the routine.

According to the present embodiment, the driving_ECU 14 issues the advance notification of a change in the lighting status to the driver when the remaining time T1 until the traffic signal lighting status changes reaches the set time Tth while the subject vehicle M is stopped because the traffic signal illuminates a red light. The driving_ECU 14 issues the clear-to-start notification to the driver when the delay time Td has elapsed since it has been determined, while the subject vehicle M remains stopped, that external conditions are clear for the subject vehicle M to proceed. To issue the clear-to-start notification, the driving_ECU 14 adjusts the delay time Td to be longer when the advance notification has been issued than when no advance notification has been issued. With this configuration, effective notifications that prompt the driver to start the subject vehicle M can be issued without causing annoyance.

This implies that when the subject vehicle M is stopped due to a red light, the driving_ECU 14 can precisely prompt the driver to promptly start the subject vehicle M by using both the advance notification and the clear-to-start notification. In this case, the driving_ECU 14 adjusts the delay time Td to be longer when the advance notification has been issued than when no advance notification has been issued. This configuration prevents the advance notification and the clear-to-start notification from being issued in rapid succession within a short period.

By contrast, the driving_ECU 14 adjusts the delay time Td to be shorter when no advance notification has been issued than when the advance notification has been issued. This configuration issues the clear-to-start notification to the driver promptly when no advance notification is issued. As such, when no advance notification is issued, the driver can be precisely prompted to start the subject vehicle M promptly.

When the subject vehicle M starts before the clear-to-start notification, the driving_ECU 14 does not issue the clear-to-start notification. This configuration avoids unnecessary notifications to the driver.

When the advance notification is issued, the driving_ECU 14 adjusts the delay time Td to increase as the distance from the stopped subject vehicle M to the traffic signal decreases. This configuration further optimizes the timing of issuing the clear-to-start notification.

This implies that when the subject vehicle M is stopped far from the traffic signal, vehicles start sequentially following a change in the traffic signal lighting status. As a result, a relatively long time may elapse from the change in the traffic signal lighting status until external conditions are clear for starting the subject vehicle M. By contrast, when the subject vehicle M is stopped close to the traffic signal, external conditions become clear for starting the subject vehicle M within a relatively short period following the change in the traffic signal lighting status. As described above, by controlling the time until the subject vehicle M is ready to start, which varies based on the stop location of the subject vehicle M, through adjustments of the delay time Td using the adjustment amount, the driving_ECU 14 can optimize the timing for issuing the clear-to-start notification.

When the advance notification is issued by the driving_ECU 14, the E/G_ECU 22 suppresses engine output in relation to the amount of accelerator pedal depression until the clear-to-start notification is issued. This configuration precisely prevents collisions with the preceding vehicle P when the driver mistakenly attempts to start the vehicle in response to the advance notification.

In this case, the E/G_ECU 22 increases the suppression of engine output as the time elapsed since the advance notification decreases. This configuration more precisely prevents collisions and other accidents resulting from driver errors.

The E/G_ECU 22 prohibits engine stop after the advance notification is issued, regardless of whether engine stop criteria are satisfied while the subject vehicle M is stopped. This configuration enables a quick start in response to the driver's start operation when the clear-to-start notification is issued.

In the embodiment described above, the image recognition_ECU 13, the driving_ECU 14, the CP_ECU 21, the E/G_ECU 22, the T/M_ECU 23, the BK_ECU 24, and the PS_ECU 25 are implemented by a known microcomputer including elements such as a central processing unit (CPU), a random-access memory (RAM), a read-only memory (ROM), and a non-volatile memory, and peripheral devices. Programs to be run by the CPU and fixed data such as data tables may be previously stored in the ROM. All or part of the functions of the processor may be implemented by logic or analog circuits. Additionally, the operations of the various programs may be performed by an electronic circuit such as a field-programmable gate array (FPGA).

The disclosure described in the aforementioned embodiment is not limited to that specific embodiment. Various modifications can be applied at the implementation stage without departing from the essence of the disclosure.

For example, in the embodiment described above, an exemplary configuration using an engine as the drive source has been described. In the embodiment described above, an exemplary control for suppressing the output of the drive source (engine) has been described. This suppression is achieved by decreasing the throttle opening degree relative based on the accelerator pedal opening degree, from when the advance notification is issued until the clear-to-start notification is issued. For example, in electric vehicles, hybrid vehicles, and other vehicles that include a motor as the drive source, the output of the drive source (motor) can be suppressed by suppressing the motor drive power based on the accelerator pedal opening degree.

Furthermore, the embodiment includes examples at various stages, and various combinations of the disclosed configurational features can be appropriately selected to create different examples.

For example, when removing some configurational features from those described in the embodiment still addresses the described issues and achieves the described effects, the configuration omitting these configurational features can be selected as an example.

The vehicle operating assistance systems according to some embodiments of the disclosure can issue effective notifications that prompt the driver to start the subject vehicle without causing annoyance.

The image recognition_ECU 13, the driving_ECU 14, the CP_ECU 21, the E/G_ECU 22, the T/M_ECU 23, the BK_ECU 24, and the PS_ECU 25 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the image recognition_ECU 13, the driving_ECU 14, the CP_ECU 21, the E/G_ECU 22, the T/M_ECU 23, the BK_ECU 24, and the PS_ECU 25. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 1.

The invention claimed is:

1. A vehicle operating assistance system comprising:
a circuitry configured to
recognize travel environment information of a vehicle including a lighting status of a traffic signal;
issue an advance notification of a change in the lighting status of the traffic signal to a driver who operates the vehicle, in response to a remaining time until the lighting status changes being equal to or less than a set time while the vehicle is stopped because the traffic signal illuminates a red light;
issue, to the driver, a clear-to-start notification for the vehicle, when a delay time elapses since it is determined, while the vehicle is stopped, that an external condition is clear for the vehicle to proceed; and
adjust the delay time to be longer when the advance notification is issued than when no advance notification is issued.

2. The vehicle operating assistance system according to claim 1, wherein the circuitry is further configured to:
when the advance notification is issued, adjust the delay time such that the delay time increases as a distance between the stopped vehicle and the traffic signal decreases.

3. A vehicle operating assistance system, comprising:
a circuitry configured to
recognize travel environment information of a vehicle including a lighting status of a traffic signal;
issue an advance notification of a change in the lighting status of the traffic signal to a driver who operates the vehicle, when a remaining time until the lighting status changes reaches a set time while the vehicle is stopped because the traffic signal illuminates a red light;
issue, to the driver, a clear-to-start notification for the vehicle, when a delay time elapses since it is determined, while the vehicle is stopped, that an external condition is clear for the vehicle to proceed;
adjust the delay time to be longer when the advance notification is issued than when no advance notification is issued; and
control a drive source of the vehicle, and suppress an output of the drive source in relation to an accelerator pedal depression amount from when the advance notification is issued until the clear-to-start notification is issued.

4. The vehicle operating assistance system according to claim 3, wherein the circuitry is further configured to:
prohibit stopping of an engine of the vehicle after the advance notification is issued, regardless of whether an engine stop criterion is satisfied while the vehicle is stopped.

5. A vehicle operating assistance system comprising:
a travel environment recognition module including a sensor and configured to recognize travel environment information of a vehicle including a lighting status of a traffic signal; and
a processor configured to
issue an advance notification of a change in the lighting status of the traffic signal to a driver who operates the vehicle, in response to a remaining time until the lighting status changes being equal to or less than a set time while the vehicle is stopped because the traffic signal illuminates a red light,
issue a clear-to-start notification for the vehicle to the driver, when a delay time elapses since it is determined, while the vehicle is stopped, that an external condition is clear for the vehicle to proceed, and
for issuing the clear-to-start notification, adjust the delay time to be longer when the advance notification is issued than when no advance notification is issued.

6. The vehicle operating assistance system according to claim 5, wherein the processor is configured to control a drive source of the vehicle and suppress an output of the drive source in relation to an accelerator pedal depression amount from when the advance notification is issued until the clear-to-start notification is issued.

7. The vehicle operating assistance system according to claim 6, wherein the processor is configured to prohibit stopping of an engine of the vehicle after the advance notification is issued, regardless of whether an engine stop criterion is satisfied while the vehicle is stopped.

* * * * *